P. DANIELS.
Tire-Tightener.
No. 53,957. Patented Apr. 17, 1866.
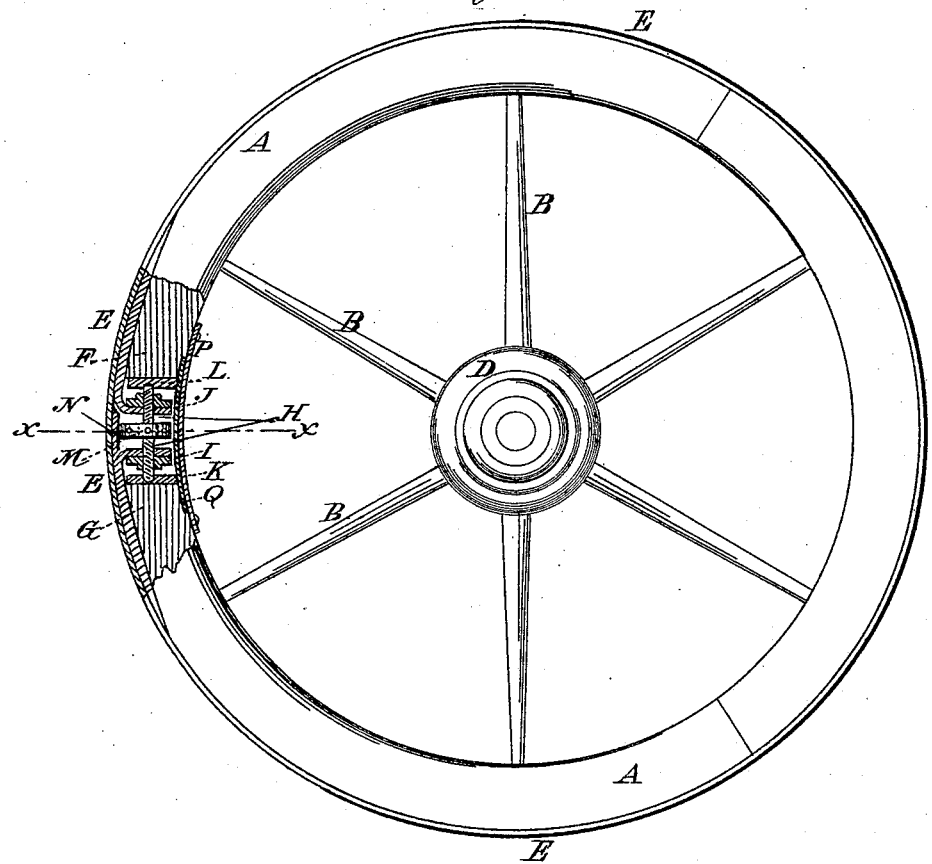
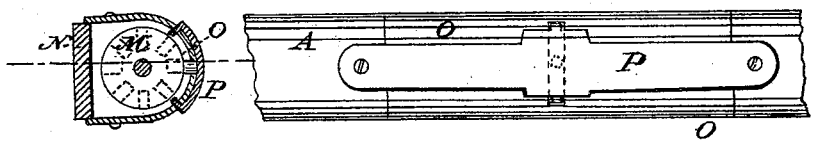
Witnesses:
Wm E Lyon
Wm Trewrn
Inventor:
P Daniels
By Munn & Co
Attorneys

UNITED STATES PATENT OFFICE.

P. DANIELS, OF JACKSON, MICHIGAN.

IMPROVEMENT IN TIRE-TIGHTENERS.

Specification forming part of Letters Patent No. 53,957, dated April 17, 1866.

*To all whom it may concern:*

Be it known that I, PHYLANDER DANIELS, of Jackson, in the county of Jackson and State of Michigan, have invented a new and useful Improvement in Tire-Tighteners; and I do hereby declare that the following is a full, clear, and exact description thereof, which will enable others skilled in the art to make and use the same, reference being had to the accompanying drawings, forming part of this specification, in which—

Figure 1 is a side view of a wagon-wheel, partly in section, with my improved tire-tightener attached. Fig. 2 is a cross-section through the line $x\,x$, Fig. 1. Fig. 3 is an under-side view of that part of the rim of the wheel at which my improvement is attached.

Similar letters of reference indicate like parts.

My invention has for its object the furnishing a convenient means by which the tire of a wheel may be tightened to compensate for the shrinkage of the fellies as and when it may become loose by said shrinkage; and it consists in combining with the rim of a wheel a screw with right and left threads and a lever-wheel, and also in combining with said wheel a cap or caps, as hereinafter more fully described.

A are the fellies, B the spokes, D the hub, and E the tire, of a wheel. The end of one or both of two consecutive fellies is cut away, as represented in Fig. 1, to allow space for the insertion and attachment of my improvement. The tire is also cut as shown in Fig. 1, and when applied to the wheel should be of such a length that its ends will almost meet when said tire is drawn tightly around the fellies.

To the under side of the tire E, near the place where it is cut, are attached two pieces, F and G. These pieces are bent down at right angles to the tire, so that the projecting portions of said pieces may project into the space formed by cutting away the ends of the fellies A. Holes are made through these pieces for the passage of the screw H. This screw H has a right thread cut on one end and a left thread cut on the other, so that by turning the screw the nuts I and J may both be drawn up or forced back at the same time. The ends of the screw H rest against the plates K and L which cover the ends of the fellies A and prevent the ends of the screw from being forced into the ends of the fellies.

The screw H is operated by the lever-wheel M, which is attached to its central part, as shown. Around the circumference of said wheel are formed holes, into which fits the end of a small lever by which the wheel may be turned when desired.

N is a small plate placed under the cut in the tire E, to prevent the dust or mud from finding its way through said cut into the space between the ends of the fellies. The plate N may have a projecting ridge or flange projecting into the openings between the ends of the tire, as shown.

O is a cap covering the opening between the ends of the fellies. This cap has a slit through its lower side directly over the lever-wheel M, through which the lever may be inserted for operating the wheel M and screws H. This opening through the cap O is covered by a second cap, P, which has a pin. (Shown in Fig. 2 and in dotted lines in Fig. 3.) This pin is designed to pass up into one of the holes in the lever-wheel M, to prevent the screw H from being loosened by the jar of the wheel.

I claim as new and desire to secure by Letters Patent—

The pieces F G, in combination with the tire of a wheel, arranged relatively with the right-and-left-threaded screw, and operating in the manner and for the purpose herein specified.

P. DANIELS.

Witnesses:
M. M. LIVINGSTON,
JAMES T. GRAHAM.